W. H. COLEMAN.
ICE-AXES.
No. 189,339.        Patented April 10, 1877.
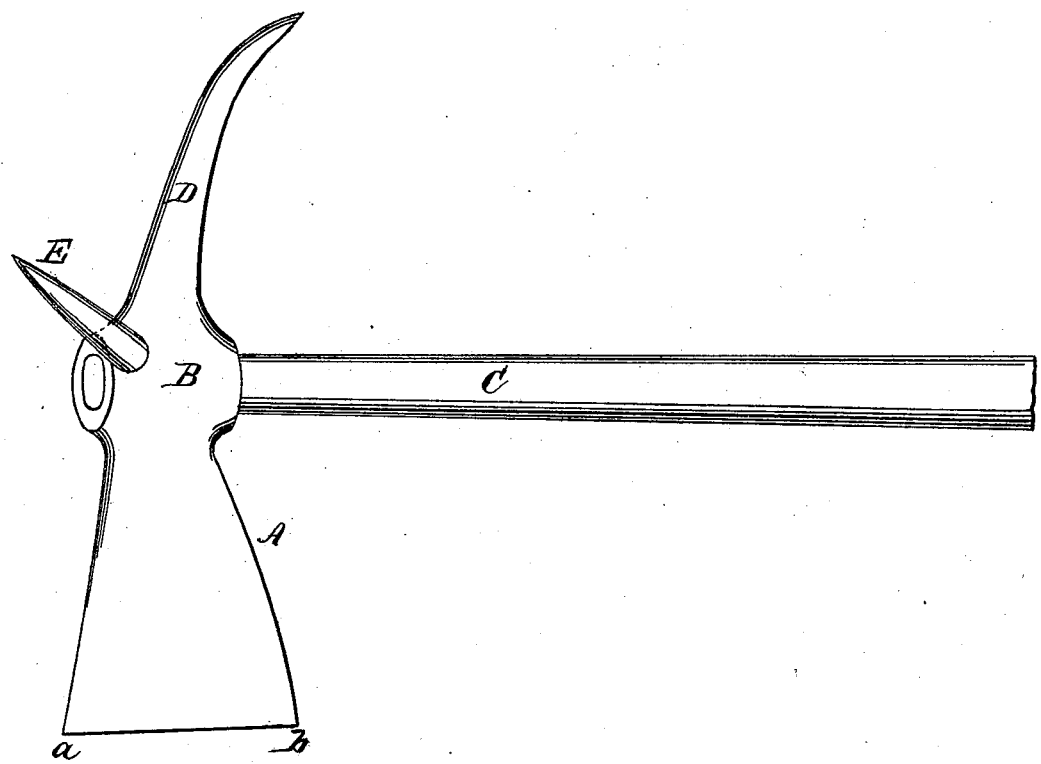
WITNESSES:
E. Wolff
J. H. Scarborough
INVENTOR:
W. H. Coleman.
BY
ATTORNEYS.

UNITED STATES PATENT OFFICE.

WILLIAM H. COLEMAN, OF SALISBURY MILLS, NEW YORK.

IMPROVEMENT IN ICE-AXES.

Specification forming part of Letters Patent No. 189,339, dated April 10, 1877; application filed February 3, 1877.

*To all whom it may concern:*

Be it known that I, WILLIAM HARRISON COLEMAN, of Salisbury Mills, in the county of Orange and State of New York, have invented an Improvement in Ice-Axes, of which the following is a specification:

The object of my invention is to provide a tool for cutting and handling ice, which shall combine in a single instrument an ax for cutting ice, a pike for pushing it from place to place, and a hook for drawing it from the water.

Referring to the drawing, which is a side elevation, A is an ax-head, provided with the eye B, for receiving the handle C, and with the cutting-edge $a\ b$, which is parallel with the line of the handle.

On the side of the eye, directly opposite the cutting-edge $a\ b$, a hook, D, is formed, that curves backward toward the handle, the curve decreasing in radius toward the point of the hook.

E is a pike, attached to the side of the eye B, and projecting from it diagonally, forming an angle of fifteen or twenty degrees with the line of the handle.

The cutting-edge $a\ b$ is used in cutting and dressing the ice. The hook D is used for drawing the blocks of ice out of the water, and the pike E is designed for pushing the blocks.

It will be seen that the instrument takes the place of three indispensable tools for harvesting ice—viz., the ax, the tongs or hook and pole, and a pike-pole. By using this instrument the time usually wasted in changing from one tool to another is saved.

Having thus described my invention, I claim as new and desire to secure by Letters Patent—

An instrument for harvesting ice, consisting of an ax having formed on it the hook D and pike E, substantially as herein shown and described.

WILLIAM HARRISON COLEMAN.

Witnesses:
   C. C. GEROW,
   A. GOODMAN, Jr.